(12) United States Patent
Skuratowicz et al.

(10) Patent No.: US 10,316,178 B2
(45) Date of Patent: Jun. 11, 2019

(54) STARCH SUSPENSION FOR ADHESIVE COATINGS

(71) Applicant: Corn Products Development, Inc., Westchester, IL (US)

(72) Inventors: Roman Skuratowicz, Hickory Hills, IL (US); Joseph Squires, Somerset, NJ (US)

(73) Assignee: Corn Products Development, Inc., Westchester, IL (US)

( * ) Notice: Subject to any disclaimer, the term of this patent is extended or adjusted under 35 U.S.C. 154(b) by 0 days.

(21) Appl. No.: 15/616,710

(22) Filed: Jun. 7, 2017

(65) Prior Publication Data

US 2018/0355162 A1    Dec. 13, 2018

(51) Int. Cl.
| | |
|---|---|
| *C08L 3/00* | (2006.01) |
| *C08L 5/00* | (2006.01) |
| *C08L 29/04* | (2006.01) |
| *D21H 17/00* | (2006.01) |
| *D21H 17/28* | (2006.01) |
| *D21H 17/31* | (2006.01) |
| *D21H 17/36* | (2006.01) |
| *D21H 21/18* | (2006.01) |
| *C09J 129/04* | (2006.01) |

(52) U.S. Cl.
CPC .............. *C08L 29/04* (2013.01); *C08L 3/00* (2013.01); *C08L 5/00* (2013.01); *C09J 129/04* (2013.01); *D21H 17/28* (2013.01); *D21H 17/31* (2013.01); *D21H 17/36* (2013.01); *D21H 17/72* (2013.01); *D21H 21/18* (2013.01); *C08L 2201/54* (2013.01)

(58) Field of Classification Search
CPC .... C08L 3/00; C08L 3/02; C08L 29/04; C08L 5/00
See application file for complete search history.

(56) References Cited

U.S. PATENT DOCUMENTS

| | | | | |
|---|---|---|---|---|
| 4,820,380 A * | 4/1989 | O'Callaghan | ............. | C08L 3/02 162/135 |
| 4,873,147 A * | 10/1989 | Jansen | .................. | C09J 103/06 427/393.4 |
| 5,358,559 A * | 10/1994 | Fitt | ........................ | C09J 103/00 106/163.01 |
| 5,424,088 A * | 6/1995 | Christianson | .......... | A21D 2/183 426/573 |
| 5,503,668 A * | 4/1996 | Giesfeldt | ............... | C09J 103/00 106/217.7 |
| 5,522,926 A | 6/1996 | Richard et al. | | |
| 5,777,005 A * | 7/1998 | Giesfeldt | ............... | C09J 103/00 524/53 |
| 6,063,178 A * | 5/2000 | McPherson | ............ | C09J 103/02 106/163.01 |
| 6,179,905 B1 * | 1/2001 | McPherson | .......... | C09D 103/02 106/163.01 |
| 6,221,420 B1 | 4/2001 | Thomas et al. | | |
| 6,277,186 B1 | 8/2001 | Shi et al. | | |
| 6,368,443 B1 * | 4/2002 | Fitt | ........................ | C09J 103/00 156/205 |
| 6,391,352 B1 * | 5/2002 | Hawkes | ................. | A23C 9/137 426/96 |
| 8,471,003 B2 | 6/2013 | Weisser et al. | | |
| 8,821,689 B1 * | 9/2014 | Holland | ................. | D21H 17/31 106/162.1 |
| 2004/0102546 A1 * | 5/2004 | Skuratowicz | ......... | B31F 1/2818 524/47 |
| 2005/0229814 A1 * | 10/2005 | Muvundamina | ...... | B31F 1/2809 106/211.1 |
| 2007/0149657 A1 * | 6/2007 | Skuratowicz | ............. | B32B 3/28 524/47 |
| 2013/0236624 A1 * | 9/2013 | Trksak | .................. | A23L 1/0522 426/578 |
| 2014/0364514 A1 * | 12/2014 | Tan | .......................... | C08L 1/04 514/778 |

FOREIGN PATENT DOCUMENTS

| | | |
|---|---|---|
| WO | WO 96/03891 A1 | 2/1996 |
| WO | WO 96/03892 A1 | 2/1996 |

* cited by examiner

*Primary Examiner* — Liam J Heincer
(74) *Attorney, Agent, or Firm* — Jacqueline Cohen; Jason Grauch

(57) ABSTRACT

This specification discloses suspensions and method for making the suspensions. The suspension comprises a suspension medium and is loaded with an insoluble solid. The suspension medium is an aqueous solution made at least one soluble polymer and at least one thixotropic gum. The suspension medium can be loaded with high levels of solids (more than 15% by weight of the medium). The resulting suspension is highly stable and has low viscosity. In embodiments the suspension exhibits no significant sedimentation for at least 3 months, and has a viscosity of less than about 20,000 cP. In an illustrative embodiment, the suspensions may be used to improve the properties of corrugating adhesives by adding to a corrugating adhesive a suspension that has suspension medium comprising polyvinyl alcohol and gellan and that suspends unmodified high amylose starch.

8 Claims, No Drawings

STARCH SUSPENSION FOR ADHESIVE COATINGS

BACKGROUND

The present invention relates to suspensions made with a suspension medium comprising a solution of at least one soluble polymer and at least one thixotropic gum, and a dispersed solid, typically a starch. The suspension is stable and has low viscosity even when carrying high solid loads. The disclosed suspensions are useful in paper making, and, more particularly, are useful for improving corrugating adhesives.

Starch is a widely used additive in making paper, but presents several difficulties in use, some of which are described in U.S. Pat. No. 8,821,689 to Holland et al., which is incorporated by reference into this specification in its entirety. The '689 patent discloses a suspension useful as part of wet-end paper processing for increasing the strength of paper. The suspension medium consists of a paste made from cooked starch and thixotropic gum with embodiments using a suspension medium of cooked cationic starch and carrageenan.

The suspensions of the '689 patent, however, have limited functionality and so have limited uses. So, there is a need for alternate suspensions that have different functional characteristics making them useful in a broader range of applications.

SUMMARY

This specification discloses suspensions having a suspension medium that suspends solid particles. The suspension medium is a solution comprising a soluble polymer, a thixotropic gum, and water. The suspension medium can be loaded with high levels (more than 1.5% by weight) of solids, for example starch. At such loads, the suspension retains both its stability and low viscosity. In embodiments, suspensions have no significant sedimentation for at least 3 months and maintain a viscosity of 20,000 cP or less.

In embodiments the suspension medium comprises between about 2% and about 40% (by weight) polymer and between about 0.01% and about 5% by weight gum. The suspension is loaded with a solid ingredient that can be delivered as needed as part of the liquid suspension.

In embodiments, the solid ingredient is typically starch, which may be modified or unmodified, so long as the modification does not render the starch soluble within the suspension medium.

In embodiments, the suspension medium can be loaded with high levels of starch, up to about 50%, by weight of the medium.

In embodiments the polymer is polyvinyl alcohol, the gum is gellan, and the starch is unmodified high amylose corn starch.

The specification also discloses methods of making the suspension, In embodiments water, soluble polymer and thixotropic gum are mixed at between 75° and 99° C. for between 5 minute and 60 minutes to form a suspension medium. The medium is allowed to cool to below 50° before solid to be suspended (for example starch) is added. The suspension is then allowed to cool to ambient temperature and other ingredients, such as dyes, preservatives, and biocides can be added as needed. Additionally, other ingredients may be added to adjust the functional properties of the suspension. For example, in embodiments, bases or acids may be added to alter the pH of the suspension. In embodiments, the suspension may have a pH range from about 2.5 to about 11.5.

This specification also discloses methods of using the suspension. In embodiments the suspension is useful in paper making processes. In embodiments the suspension is added during the paper making process to deliver starch additives that improve the paper or paper making process. In addition the polymer may be selected to be a performance additive to improve the paper or paper making process.

In embodiments the suspension can be used to make corrugating adhesives, or can be used as part of a corrugating adhesive that is added during a corrugated paper product manufacturing process. In embodiments corrugating adhesives are made by mixing water, unmodified starch, base, and boric acid or a boric acid salt for sufficient time to make a corrugating adhesive. The performance of the adhesive can be improved by adding a suspension comprising between about 10% and about 15% polyvinyl alcohol (by weight of the medium), between about 0.01% and about 1% gellan (by weight of the medium) and between about 15% and about 50% starch unmodified high amylose starch (by weight of the medium).

DETAILED DESCRIPTION

Disclosed in this specification are suspensions having a suspension medium made from solution comprising one or more soluble polymers, water, and one or more thixotropic gums. The suspensions are stable and have low viscosity at high solids loads.

Within this specification, the term suspension has its ordinary meaning: it is a dispersion of solid particles in a liquid. Within this specification the liquid component is referred to as the suspension medium. So, within this specification use of the term suspension refers to a composition that comprises the suspension medium and solids.

Within this specification, the suspension medium is an aqueous solution comprising at least one soluble polymer and one thixotropic gum. During the process of making the suspension both the polymer and gum component may be provided as solids, but both are dissolved in water to form the solution that is the suspension medium.

Within this specification, the solid particles to be dispersed in the suspension medium may be any solid that may be dispersed within the medium that does not dissolve in the suspension medium. Additionally, within this specification the process of dispersing the solids within the suspension medium is called loading, and a suspension medium having solids dispersed within it, is said to be loaded with the solids.

Within this specification, unmodified starch is starch that has been milled to be in. granular form but has not otherwise been modified, for example by chemical, enzymatic, or physical means; a gelatinized starch is a modified starch.

Within this specification, high amylose starch is starch having greater than 40% amylose.

Within this specification, stable, with reference to the suspension, means that the suspension will have no significant sedimentation after at least three months storage at typical. room temperatures.

Within this specification, typical room temperatures are called ambient temperatures. For illustrative purposes only, ambient temperatures may range between about 5° and about 45° C.

Within this specification, no significant sedimentation means that at least 90% of the solids initially dispersed in the suspension will remain dispersed within the suspension after 3 months. In other words at most about 10% of the initial load of solids dispersed within the suspension medium has precipitated out of the medium after 3 months.

Within this specification, soluble polymers are soluble at room temperature (about 22° C.) or with minimal heating (to no more than about 60° C.), and build viscosity based on their molecular weight. With reference to the disclosed invention, and without being bound by theory, it is believed that the gum forms networks that suspend the starch. Suitable polymers do not disrupt these networks. More preferably the polymers have a functional affinity for the gum, which may further enhance the suspension medium's ability to suspend starch.

Within this specification, thixotropic means generally a time-dependent shear thinning property of gels or fluids, for examples, gels or fluids that are thick, or viscous, under static conditions will flow (i.e. become thin or less viscous) over time when shaken, agitated, sheared or otherwise stressed, hence a time dependent viscosity. With respect to gums, thixotropic gums impart a thixotropic property to a gel or fluid regardless of the mechanism of action.

Within this specification, viscosity is determined with a Brookfield Viscometer, RVT class, using an SSD spindle at 30 rpm, at room temperature ((i.e. about 22° C).

Within this specification all percentages are weight percentages unless specified otherwise.

Within this specification the naming of certain subranges does not preclude the disclosure of alternate subranges: all subranges with in the broadest disclosed range are also disclosed.

In embodiments, examples of soluble polymers are those having alcohol, carboxyl, or carbonyl groups, as well as those having short chain alkyl, carboxyakyl, or hydroxyalkyl groups. More specific examples of polymers include polyvinyl alcohol, alginates, carboxymethylcellulose, and polyacrylic acid, and derivatives of these polymers using the above referenced functional groups, as well as mixtures thereof.

In embodiments the soluble polymer is polyvinyl alcohol. The polyvinyl alcohol may be used in various grades. In embodiments, the hydrolysis of the polyvinyl alcohol can range between about 70% and 99%, in embodiments between about 75% and about 90%, in embodiments between 78% and 88%. In embodiments the viscosity of a 4% aqueous polyvinyl alcohol solution at 20° C. is between about 1 and about 7.5 cP, in other embodiments, between about 2 and about 5 cP, in other embodiments between about 3 and 4 cP.

In embodiments thixotropic gums useful in the invention include gellan, xanthan gum, locust bean gum, carrageenan, guar, alginate, carboxymethylcellulose, hydroxyethylcellulose, hemicellulose, gum Arabic and agar. The gurus may be used alone and in combination, Certain of the gums may also be used as the soluble polymer, for example carboxyrnethylcellulose, hydroxyethylcellulose, and alginates. In such embodiments the gum may be used as both the polymer and gum, or may be used in conjunction with another gum.

In embodiments the suspension medium comprises one or more gums. The total amount of gum may be as high as about 5% (by weight of the medium) (i.e. ranging from about 0.001% to about 5%), more typically gums are used in amounts of less than about 2.5%, in other embodiments in amounts of between about 0.001% and about 1%, in other embodiments between about 0.01% and about 0.1%, weight percent of the suspension medium.

In embodiments the suspension medium comprises one or more soluble the polymers. The total polymer content of the suspension medium may be as high as about 40% (by weight of the medium). In embodiments between about 2% and about 40%, in embodiments between about 5% and about 30%, in embodiments between about 10 and about 15%.

The gum and soluble polymer are dissolved in water so that in total the suspension medium comprises up to about 45% by weight of the gum and polymer in water. In embodiments between about 2% and about 45%.

The disclosed suspension mediums are designed to carry high loads of solids. The solid may be any ingredient that is insoluble within the suspension medium. In other words, the solid is selected so that it does not dissolve within the suspension medium and become part of the aqueous solution that is the suspension medium. Instead, the solid will remain dispersed within the suspension medium. Accordingly, the suspension allows for the delivery of the solid for some final use by delivery of the low viscosity, liquid suspension.

In embodiments the solid to be loaded into the medium is starch. The starch may be of any type and may be modified or unmodified, so long as the modification does not render the starch soluble in the suspension medium. A non-limiting list of base starches includes corn, rice, pea or other pulse, wheat, tapioca, sorghum, arrowroot, oats, sago, potato, etc. or any other commercially available starch, including high amylose variants and low amylose variants (having between about 0% and about 10% amylose, also called a waxy variant). Illustrative modifications include oxidation, acid thinning, enzymatic hydrolysis, esterification and etherification (ethylation, hydroxpropylation etc.), cationic or anionic substitution, crosslinking, OSA-starches, alkoxystarches and other modification, as long as the modification does not render the starch soluble in the suspension medium. The starch can be added to the suspension medium at levels of up to 15% by weight of the medium, in embodiments up to 25% in embodiments up to 50%.

In embodiments, other ingredients can be added to the suspension to adjust its properties. Commonly added ingredients include preservatives, biocides, dyes, acidic and basic agents, and salts. When adding acid or base, the pH of the suspension will typically be between about 2.5 and about 11.5 depending on the need, and on the type of starch being carried. Any acid or base typically used in paper making may be used to adjust the pH. Illustrative acids include hydrochloric acid, sulfuric acid, acetic acid, adipic acid, and citric acid. Illustrative bases include sodium hydroxide, sodium carbonate, calcium hydroxide, and ammonium. hydroxide. At high or low pH, salts such as sodium sulfate, sodium chloride, calcium carbonate, etc., are typically added to protect the starch from swelling.

In embodiments, the suspensions have low viscosity. In embodiments the suspension's viscosity is less than about 20,000 cP, in embodiments less than about 1.0,000 cP, in embodiments less than about 5,000 cP, in embodiments between about 1,000 and about 4,000 cP, in other embodiments between about 1,500 and 3,000 cP.

Ira embodiments, the suspensions are highly stable, in embodiments the suspensions are stable for up to 3 months with no significant sedimentation, in embodiments up to 4 months, in embodiments up to 5 months, in embodiments up to 6 months. In embodiments at least 90% of the solids initially dispersed into the suspension will remain dispersed within the suspension after 3, 4, 5, or 6 months storage at ambient temperatures, in other words the suspensions will exhibit less than 10% sedimentation. In other embodiments the suspensions exhibit less than 5% sedimentation, in others about 0% sedimentation, By way of illustration only, a suspension with no visible sedimentation may be said to have about 0% sedimentation.

In embodiments, the suspension medium is made by use of heat and shear, The polymer and gum may be homogenized and mixed with water, or they may be dissolved in water separately and have their respective solutions mixed together. The mixture of gum, polymer, and water are heated to between about 75° and about 99° C., in embodiments between about 80° C. and about 95° C., in embodiments between about 85° and about 90° C., and in embodiments about 90° C. The mixture of polymer, gum and water are mixed at those temperatures for between about 5 and about 60 minutes, in embodiments between about 7.5 and about 30 minutes, and in embodiments about 10 minutes.

In embodiments, the suspension medium is loaded with solid by allowing it to cool to below 50° C. prior to adding the solid, in other embodiments the suspension medium is cooled to between about 25° and 40° C., and in embodiments to about 30° C. The suspension is then allowed to cool to room temperature. Additional ingredients such as preservatives, biocides, and dyes are typically added at room temperature, but may be added at various times in the process. These additives are added in amounts known to those of skill in the art. As an illustrative example, biocides or preservatives are added in sufficient amounts to protect a loaded starch. This is typically about 1% by weight of the suspension (as a whole).

An illustrative embodiment of the suspension can be made using about 40 parts water, to about 6 parts polyvinyl alcohol, to about 0.05 parts gellan. The mixture is brought to 90° C. and is mixed for 10 minutes. The suspension is cooled to 30° C. and is loaded with 150 grams of high amylose corn starch, where high amylose means the starch has greater than about 40% (by weight) amylose. In embodiments high amylose starch has greater than about 50%, greater than about 60%, greater than about 70%, up to about 80% amylose. The suspension is then allowed to cool to room temperature, and a biocide is added. The above suspension is stable for up to six months with no significant sedimentation.

The disclosed suspensions provide different functionality depending on the polymer and the dispersed starch. In embodiments suspension may be used for high solids, low viscosity coating formulations, seed coatings, binder additives, and dust reclamation (for example where the suspension medium can capture solids and remove them as part of a stable, low viscosity suspension). The polymer can be adjusted as needed to provide the intended viscosity and flow properties. For example, carboxymethylcellulose provides less tack (stringiness) but higher viscosity to solutions (on an equal concentration basis) than can be achieved using polyvinyl alcohol.

In embodiments high pH suspensions (pH greater than or equal to about 8) made from polyvinyl alcohol, gellan, and carrying unmodified high amylose corn starch are useful in corrugating adhesives. Corrugating adhesives are typically made from starch, boric acid or one of its salts, and frequently use polyvinyl alcohol and base as adjuvants. Recipes are well known in the art. One illustrative recipe uses 1.67 kg of starch, 25 g borax (10 mol), 35 g of NaOH, and 4.5 L of water, which is prepared per the examples below. The suspension containing polyvinyl alcohol, gellan, base, and unmodified high amylose corn starch can be added to the adhesive, The suspension will be added to adhesive mixtures as needed, but typically in a ratio of between about 1 and about 100 g suspension per 1 kg of adhesive, in other embodiments between about 10 and 50 g per 1 kg of adhesive and in other embodiments between about 20 and about 30 g, and in embodiments about 25 g.

The following examples are provided as illustrations and should not be construed to limit the scope of the invention in any way. Persons of ordinary skill in the art will recognize that routine modifications may be made to the methods and materials used in the examples, which would still fall within the spirit and scope of the present invention.

EXAMPLE 1

Illustrative Suspension

Suspension A: Sixty grams of Celvol® 203 polyvinyl alcohol is stirred into 400 grams of water. The solution is heated to 90° C. with continuous stirring. One-half gram of gellan gum is added to the stirred solution; the combine solution is stirred for 10 minutes. The solution is then cooled to 30° C. and 150 grams Hylon® VII high amylose corn starch is stirred into the mixture. The solution is further cooled to room temperature and then treated with 1% by weight ACTICIDE® biocide. The resulting suspension is stable for up to 6 months without significant sedimentation.

Suspension B: One-half gram of gellan gum was added to 250 grams of water with continuous stirring during heating to 90° C. The mixture is held at this temperature for 10 minutes. This solution was then blended with 200 grams a polyvinyl alcohol solution (30% by weight). The combined solution is cooled to 30° C. and 150 grams of Hylon® VII is then added with stirring. This suspension is likewise treated with biocide and has similar stability.

EXAMPLE 2

Corrugating Adhesive

Slurry of 170 g water, 35 g NaOH and 2 liters of water is mixed in a container and heated with stirring to about 40° C. (105° F.). The mixture is mixed at 3000 rpm for 90 seconds. Twenty-five grams of borax (10 mol) is added with an additional 3 minutes of mixing, Two-and-one-half liters of water (about 27° C. (80° F.)) are added, followed by 1.5 kg of unmodified starch. The mixture is then mixed for 2 minutes. One kilogram of this adhesive is mixed with 25 grams of Suspension A. The resulting adhesive exhibits superior green bond (wet tack) when applied to liner and medium grade papers used to make corrugated packaging board. Upon heating of adhesive and board in a commercial corrugating process, the adhesive demonstrates superior bond strength than the same adhesive without the additive.

What is claimed is:

1. A suspension comprising:
   a) a suspension medium comprising water; between 10% and 40% of a soluble polymer (by weight of the suspension medium); between about 0.001% and about 0.1% of a thixotropic gum (by weight of the suspension medium); and
   b) an insoluble solid dispersed in the suspension medium; the suspension has a viscosity of less than 20,000 cP; and wherein the suspension is stable for at least 3 months wherein the polymer is polyvinyl alcohol, the gum is gellan gum; and the suspension comprises between 15% and 50% starch (by weight of the medium).

2. The composition of claim 1 wherein the insoluble solid is a modified or unmodified base starch, and the base starch is selected from the group consisting of corn, rice, pea or other pulse, wheat, tapioca, sorghum, arrowroot, oats, sago, potato, including high amylose and low amylose variants.

3. The composition of claim 1 wherein the insoluble solid is high amylose corn starch.

4. The composition of claim 1 wherein the suspension medium comprises between more than 10% and 15% polymer (by weight of the medium), and the starch is an unmodified or a modified high amylose corn starch.

5. A method of making a suspension comprising:
mixing water; a soluble polymer; and a thixotropic gum at between 75° and 99° C. for between 5 and 60 minutes to form a suspension medium;
allowing the medium to cool to between 25° and 50° C.; and adding starch to the medium to form a suspension;
wherein the soluble polymer is polyvinyl alcohol used in an amount of 10% to 40% (by weight of the suspension medium), the gum is gellan gum used in an amount about 0.001% and about 0.1% (by weight of the suspension medium); the suspension has a viscosity of less than 20,000 cP; and wherein the suspension is stable for at least 3 months; and wherein starch used in amount of at least 15% to 50% (by weight of the suspension medium).

6. The method of claim 5 wherein the suspension medium comprises between 10% and 15% polymer (by weight of the medium), and the suspension comprises between 15% and 50% starch (by weight of the medium), the starch is unmodified or a modified high amylose corn starch.

7. The composition of claim 1 wherein the insoluble solid is a pea starch.

8. The composition of claim 1 wherein the suspension medium comprises between more than 10% and 15% polymer (by weight of the medium), and the starch is an unmodified or modified pea starch.

* * * * *